US012459792B2

(12) United States Patent
Otsuka

(10) Patent No.: US 12,459,792 B2
(45) Date of Patent: Nov. 4, 2025

(54) ARTICLE LIFTING/LOWERING APPARATUS

(71) Applicant: Daifuku Co., Ltd., Osaka (JP)

(72) Inventor: Hiroshi Otsuka, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 342 days.

(21) Appl. No.: 18/202,378

(22) Filed: May 26, 2023

(65) Prior Publication Data

US 2023/0382696 A1 Nov. 30, 2023

(30) Foreign Application Priority Data

May 30, 2022 (JP) ................................ 2022-087757

(51) Int. Cl.
*B66D 1/00* (2006.01)
*B66D 1/24* (2006.01)
*B66D 1/50* (2006.01)

(52) U.S. Cl.
CPC ............... *B66D 1/505* (2013.01); *B66D 1/24* (2013.01)

(58) Field of Classification Search
CPC ........ B66D 1/505; B66D 1/24; B66C 13/085; B66C 13/14; B66C 13/22; B66C 13/23; B66C 13/44; B66C 13/48
See application file for complete search history.

(56) References Cited

U.S. PATENT DOCUMENTS 6,644,629 B1 * 11/2003 Higashi .................... B66D 1/56 254/361
2018/0122656 A1 * 5/2018 Murakami .............. B66C 1/663

FOREIGN PATENT DOCUMENTS

| | | | | | |
|---|---|---|---|---|---|
| JP | 2007276962 A | | 10/2007 | |
| JP | 2017218242 A | * | 12/2017 | B66D 1/50 |
| WO | WO-2015076116 A1 | * | 5/2015 | B66D 5/30 |
| WO | WO-2015163137 A1 | * | 10/2015 | B66D 1/485 |
| WO | WO-2017209269 A1 | * | 12/2017 | B66D 1/50 |

* cited by examiner

*Primary Examiner* — Emmanuel M Marcelo
(74) *Attorney, Agent, or Firm* — The Webb Law Firm

(57) ABSTRACT

When a holding unit is lowered, a control unit gradually increases the lowering velocity of the holding unit toward a target lowering velocity, performs a constant velocity lowering operation of maintaining the lowering velocity of the holding unit at the target lowering velocity, and then gradually decreases the lowering velocity of the holding unit from the target lowering velocity to stop the holding unit. The control unit controls the drive unit to gradually increase the rotational velocity of the pulleys in response to a gradual decrease in the diameter of the outer surface of the belt wound-up around the pulley by unwinding in the constant velocity lowering operation.

6 Claims, 6 Drawing Sheets

ARTICLE LIFTING/LOWERING APPARATUS

CROSS-REFERENCE TO RELATED APPLICATION

This application claims priority to Japanese Patent Application No. 2022-087757 filed May 30, 2022, the disclosure of which is hereby incorporated by reference in its entirety.

BACKGROUND OF THE INVENTION

1. Field of the Invention

The present invention relates to an article lifting/lowering apparatus including a holding unit holding an article, a lifting/lowering device lifting/lowering the holding unit, and a control unit controlling the lifting/lowering device.

2. Description of the Related Art

An example of such an article lifting/lowering apparatus is disclosed in JP-A-2007-276962 (Patent Literature 1). In the following description of the background art, reference numerals in Patent Literature 1 are quoted in brackets. In Patent Literature 1, an article lifting/lowering apparatus is provided in a carrier (2) transporting an article (24). This article lifting/lowering apparatus includes a lifting/lowering stand (20) holding the article (24), a lifting/lowering device lifting/lowering the lifting/lowering stand (20), and a lifting/lowering motor control unit (36) controlling the lifting/lowering device. The lifting/lowering device includes a drum (14), a suspension material (18) wound around the drum (14), and a lifting/lowering motor (12) rotationally driving the drum (14), in which the lifting/lowering stand (20) is lowered by unwinding the suspension material (18) from the drum (14), and the lifting/lowering stand (20) is lifted by winding-up the suspension material (18) around the drum (14).

When a holding unit (lifting/lowering stand in Patent Literature 1) holding the article is lowered, it is conceivable to perform an accelerated lowering operation of gradually increasing the lowering velocity of the holding unit toward the target lowering velocity, a constant velocity lowering operation of maintaining the lowering velocity of the holding unit at the target lowering velocity, and then a decelerated lowering operation of gradually decreasing the lowering velocity of the holding unit from the target lowering velocity to stop the holding unit. The lifting/lowering velocity pattern illustrated in FIG. 3 of Patent Literature 1 is also understood to be a velocity pattern in which the accelerated lowering operation, the constant velocity lowering operation, and the decelerated lowering operation are performed as described above.

In Paragraph 0011 of Patent Literature 1, a belt is described as an example of the suspension material. When the belt is used as the suspension material as described above, the winding-up diameter, which is the diameter of the outer surface of the belt wound-up around a pulley (drum in Patent Literature 1), gradually decreases by the unwinding of the belt from the pulley. Therefore, if the rotational velocity of the pulley is made constant in the constant velocity lowering operation, the lowering velocity of the holding unit during the constant velocity lowering operation decreases with the gradual decrease in the winding-up diameter. As a result, in switching from the accelerated lowering operation to the constant velocity lowering operation, the lowering velocity of the holding unit decreases immediately after the lowering velocity has increased (in other words, decelerating immediately after accelerating), and thus a large change in the acceleration occurs in the holding unit, so that the vibration acting on the holding unit and the article held by the holding unit is likely to increase. However, Patent Literature 1 does not mention this point.

SUMMARY OF THE INVENTION

Therefore, in view of the foregoing, it has been desired to realize a technology capable of, when the holding unit is lowered by sequentially performing the accelerated lowering operation, the constant velocity lowering operation, and the decelerated lowering operation, suppressing the vibration acting on the holding unit and the article held by the holding unit in switching from the accelerated lowering operation to the constant velocity lowering operation to a low degree.

An article lifting/lowering apparatus according to this disclosure includes: a holding unit configured to hold an article; a lifting/lowering device configured to lift and lower the holding unit; and a control unit configured to control the lifting/lowering device, in which the lifting/lowering device includes: a pulley, a belt wound around the pulley to be freely wound-up and unwound; and a drive unit configured to rotationally drive the pulley, and is configured to lower the holding unit by unwinding the belt from the pulley and lift the holding unit by winding-up the belt around the pulley in a state in which the holding unit is suspended by the belt, and the control unit is configured to, when the holding unit is lowered, control the drive unit to (i) gradually increase the lowering velocity of the holding unit toward the target lowering velocity, (ii) perform a constant velocity lowering operation of maintaining the lowering velocity of the holding unit at the target lowering velocity, and then (iii) gradually decrease the lowering velocity of the holding unit from the target lowering velocity to stop the holding unit, and the control unit is configured to, in the constant velocity lowering operation, control the drive unit to gradually increase the rotational velocity of the pulley in response to a gradual decrease in the diameter of the outer surface of the belt wound-up around the pulley by the unwinding.

According to this configuration, considering that the winding-up diameter, which is the diameter of the outer surface of the belt wound-up around the pulley, gradually decreases by the unwinding of the belt from the pulley, the rotational velocity of the pulley in the constant velocity lowering operation can be increased in response to the gradual decrease in the winding-up diameter. Therefore, as compared with the case where the rotational velocity of the pulley is made constant in the constant velocity lowering operation, the change in the lowering velocity of the holding unit during the constant velocity lowering operation can be suppressed to a low degree. As a result, a change in the acceleration of the holding unit in switching from the accelerated lowering operation to the constant velocity lowering operation can be suppressed to a low degree. Thus, the vibration acting on the holding unit and the article held by the holding unit in the switching is easily suppressed to a low degree.

Further features and advantages of the article lifting/lowering apparatus will become apparent from the following description of embodiments given with reference to the drawings.

DESCRIPTION OF THE INVENTION

Figure 2:
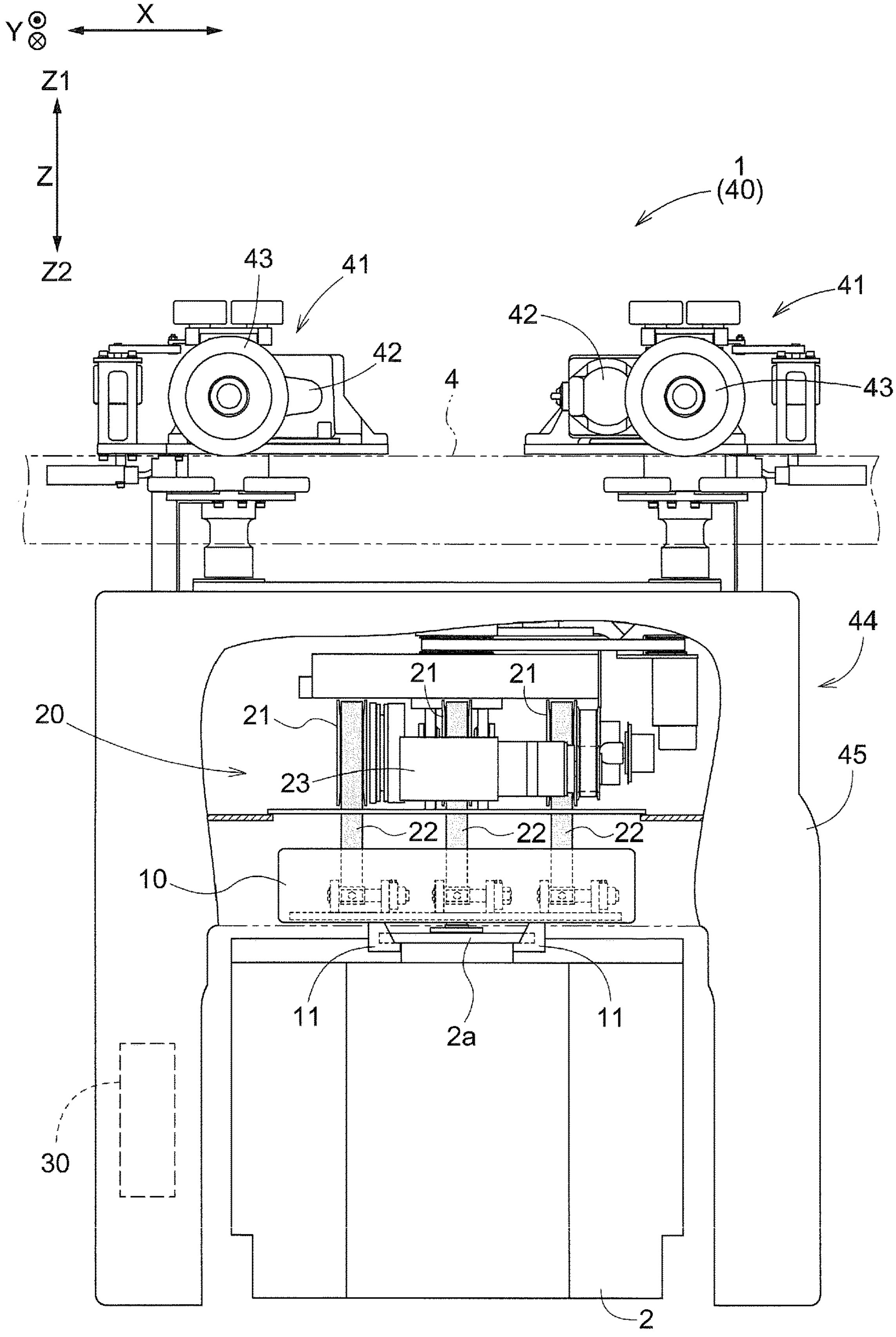
FIG. 2 is a view illustrating an article lifting/lowering apparatus according to the embodiment.

Embodiments of an article lifting/lowering apparatus are described with reference to the drawings. As illustrated in FIG. 2, an article lifting/lowering apparatus 1 includes a holding unit 10, a lifting/lowering device 20, and a control unit 30. In this embodiment, the article lifting/lowering apparatus 1 is provided in an article carrier 40, and the holding unit 10, the lifting/lowering device 20, and the control unit 30 are provided in the article carrier 40. The article carrier 40 is configured to travel in the horizontal direction and transport an article 2. Therefore, the article lifting/lowering apparatus 1 moves in the horizontal direction with the travel of the article carrier 40. Thus, in this embodiment, the article lifting/lowering apparatus 1 is configured to be movable in the horizontal direction.

The article carrier 40 travels along a traveling route and transports the article 2. Herein, the longitudinal direction (direction in which the traveling route extends) of the traveling route is defined as a route longitudinal direction X, and the width direction of the traveling route is defined as a route width direction Y. The route width direction Y is a direction orthogonal to both the route longitudinal direction X and an up-down direction Z (vertical direction). In the examples illustrated in FIGS. 1 and 2, the route longitudinal direction X is a direction orthogonal to the up-down direction Z (i.e., horizontal direction), as with the route width direction Y.

Figure 1:
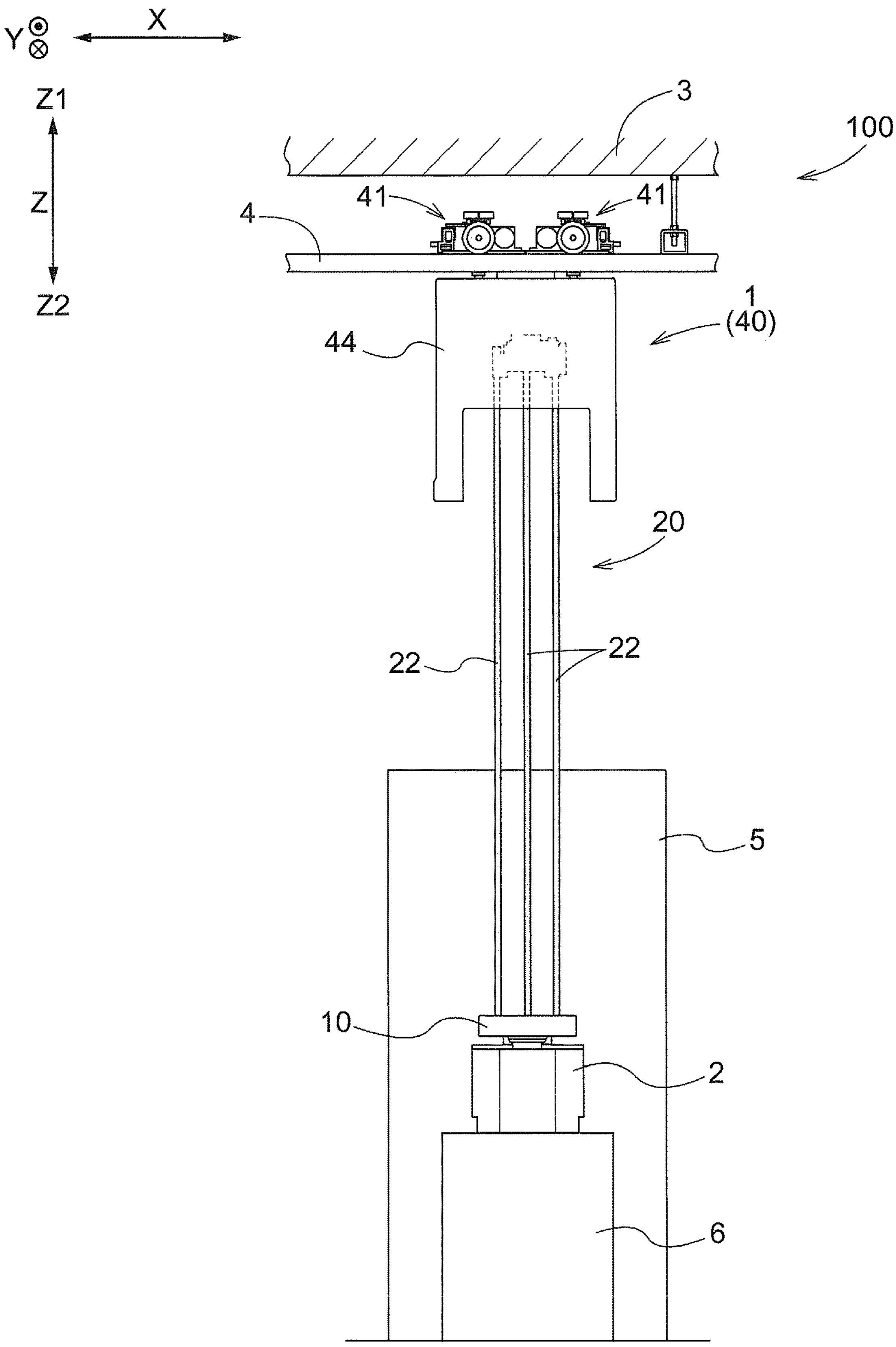
FIG. 1 is a view illustrating an article transport facility according to an embodiment.

The traveling route may be physically formed or virtually set. In this embodiment, as illustrated in FIGS. 1 and 2, the traveling route is physically formed using rails 4 (herein, a pair of rails 4 arranged with space in the route width direction Y). In this embodiment, the rails 4 are suspended and supported from a ceiling 3, and the traveling route is formed along the ceiling 3. More specifically, in this embodiment, the article carrier 40 is an overhead carrier traveling along the traveling route formed along the ceiling 3.

The article carrier 40 includes traveling units 41 traveling along the traveling route and a main body 44 connected to the traveling units 41. In this embodiment, the main body 44 is connected to the traveling units 41 in a state of being arranged on a lower side Z2 with respect to the traveling units 41. In the examples illustrated in FIGS. 1 and 2, the article carrier 40 has the traveling units 41 forming a pair aligned along the route longitudinal direction X, and the main body 44 is connected to the pair of traveling units 41.

The traveling units 41 each include a wheel 43 rolling on the traveling surfaces (herein, surfaces facing an upper side Z1) of the rails 4, and traveling drive units 42 (e.g., an electric motor, such as a servomotor) rotationally driving the wheel 43. By the rotation of the wheels 43 by the traveling drive units 42, the traveling units 41 travel along the rails 4.

The main body 44 includes the holding unit 10 holding the article 2. In this embodiment, the holding unit 10 holds the article 2 from the upper side Z1. The type of the article 2 is not limited to the following type. In this embodiment, the article 2 is a container housing a substrate, such as a semiconductor wafer, and the holding unit 10 holds the article 2 by gripping a flange portion 2*a* formed on an upper part of the article 2 with gripping portions 11.

The main body 44 has a lifting/lowering device 20 lifting/lowering the holding unit 10. As illustrated in FIG. 2, the lifting/lowering device 20 includes pulleys 21, belts 22 wound around the pulleys 21 to be freely wound-up and unwound, and a lifting/lowering drive unit 23 (e.g., an electric motor, such as a servo motor) rotationally driving the pulleys 21. One end of the belt 22 is fixed to the pulley 21 (see FIG. 3), and the other end of the belt 22 (end portion on the side where the belt is unwound from the pulley 21) is connected to the holding unit 10 (see FIGS. 1, 2). Although the details are omitted, the lifting/lowering device 20 may include a guide pulley changing the extension direction of a portion unwound from the pulley 21 in the belt 22. In this embodiment, the lifting/lowering drive unit 23 is equivalent to the "drive unit". In this specification, a rotating body around which the belt is wound is referred to as the "pulley". Therefore, the "pulley" can be rephrased as a drum, a winding-up body, or the like.

Figure 3:
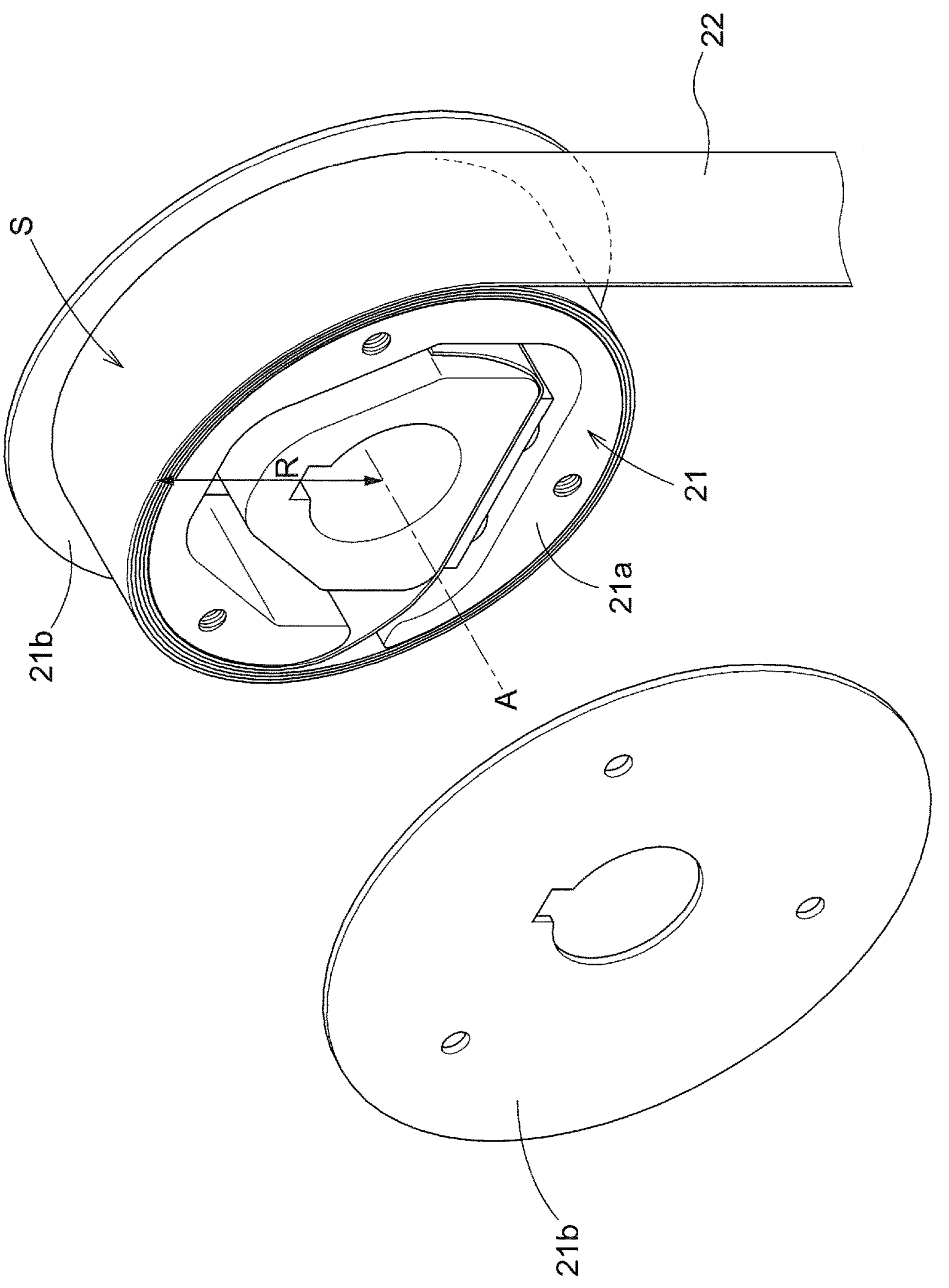
FIG. 3 is an exploded perspective view of a pulley according to the embodiment.

As illustrated in FIG. 3, in this embodiment, the pulley 21 is a pulley with a flange, and includes a winding portion 21*a* around which the belt 22 is wound and flange portions 21*b* arranged on both sides in the axial direction (direction along a rotation axis A of the pulley 21) with respect to the winding portion 21*a*. The flange portion 21*b* is formed to protrude outward in the radial direction (direction orthogonal to the rotation axis A) with respect to the outer surface of the winding portion 21*a*.

The lifting/lowering device 20 rotates the pulleys 21 in one rotation direction by the lifting/lowering drive unit 23 to unwound the belts 22 from the pulleys 21, and rotates the pulleys 21 in the other rotation direction by the lifting/lowering drive unit 23 to wind-up the belts 22 around the pulleys 21. The lifting/lowering device 20 lowers the holding unit 10 by unwinding the belts 22 from the pulleys 21 and lifts the holding unit 10 by winding the belts 22 around the pulleys 21 in the state in which the holding unit 10 is suspended by the belts 22. Thus, the lifting/lowering device 20 rotates the pulleys 21 by the lifting/lowering drive unit 23 to lift and lower the holding unit 10. As illustrated in FIG. 2, in this embodiment, the lifting/lowering device includes the three pulleys 21, and the belt 22 is wound around each of the three pulleys 21. Then, the lifting/lowering device 20 rotates these three pulleys 21 by the lifting/lowering drive unit 23 to lift and lower the holding unit 10.

When the article carrier 40 performs a traveling operation of traveling along the traveling route, the holding unit 10 is arranged at the traveling height (see FIG. 2). The traveling height is the height at which the article 2 held by the holding unit 10 is housed in the main body 44. The article 2 held by the holding unit 10 at the traveling height is arranged in the internal space of a cover portion 45 provided by the main body 44 (herein, space in which at least both sides in the route longitudinal direction X are closed).

When the article carrier 40 performs a transfer operation of the article 2 between the holding unit 10 and a transfer destination location 6, the holding unit 10 is arranged at the transferring height (see FIG. 1) corresponding to the transfer destination location 6. More specifically, when the transfer operation of the article 2 is performed by the article carrier 40, the lifting/lowering device 20 lifts/lowers the holding unit 10 between the traveling height and the transferring height. The transferring height is set to a height lower than the traveling height. The transferring height is set according to the height of each transfer destination location 6. FIG. 1 illustrates, as an example of the transfer destination location 6, a load port arranged adjacent to a processing device 5. The processing device 5 is a device processing the article 2 as the target, and, in this embodiment, applies processing to a substrate taken out from the article 2.

As illustrated in FIG. 2, the article carrier 40 includes the control unit 30 controlling the operation of the article carrier 40. The control unit 30 includes a processing unit, such as a CPU and a peripheral circuit, such as a memory, and each function of the control unit 30 is realized by the cooperation of these hardware and programs executed on hardware, such as a processing unit. The control unit 30 may be provided in the article carrier 40 (see FIG. 2) or may be provided independently of the article carrier 40. When the control unit 30 includes a plurality of pieces of hardware communicatively separated from each other, some hardware may be provided in the article carrier 40, and the remaining hardware may be provided independently of the article carrier 40.

Various technical features of the control unit 30 described below are also applicable to methods for controlling the article carrier 40 (e.g., lifting/lowering device 20, which similarly applies hereinafter) and programs for controlling the article carrier 40, and such methods and programs, and further recording media (computer readable recording media, such as optical disks and flash memories) on which such programs are recorded, are also disclosed in this specification. The programs for controlling the article carrier 40 are provided, for example, by the recording media on which the programs are recorded or are provided via a communication network, and the provided programs are stored in a storage device to which the control unit 30 (computer) can refer.

The control unit 30 controls the lifting/lowering device 20. Specifically, the control unit 30 controls the lifting/lowering drive unit 23 to cause the lifting/lowering device 20 to perform a lifting/lowering operation of lifting/lowering the holding unit 10. In this embodiment, the control unit 30 further controls the traveling units 41 and the holding unit 10. Specifically, the control unit 30 controls the traveling drive units 42 to cause the traveling units 41 to perform the traveling operation of traveling along the traveling route. Further, the control unit 30 controls a holding drive unit (not illustrated) (e.g., solenoid or electric motor) to cause the holding unit 10 to perform a holding operation of holding the article 2 and a holding release operation of releasing the holding of the article 2.

The control unit 30 causes the traveling units 41 to perform the traveling operation, thereby causing the article carrier 40 to travel to the position corresponding to the transfer destination location 6 (herein, position on the upper side Z1 relative to the transfer destination location 6 and overlapping with the transfer target portion 6 in plan view (view in a direction along the up-down direction Z)). When the article 2 is transferred to the transfer destination location 6 from the holding unit 10, the control unit 30 causes the lifting/lowering device 20 to perform a lifting/lowering operation of lowering the holding unit 10 holding the article 2 from the traveling height to the transferring height, causes the holding unit 10 to perform the holding release operation of the article 2, and then causes the lifting/lowering device 20 to perform the lifting/lowering operation of lifting the holding unit 10 in a state of not holding the article 2 from the transferring height to the traveling height. When the article 2 is transferred from the transfer destination location 6 to the holding unit 10, the control unit 30 causes the lifting/lowering device 20 to perform the lifting/lowering operation of lowering the holding unit 10 in the state of not holding the article 2 from the traveling height to the transferring height, causes the holding unit 10 to perform the holding operation of holding the article 2, and then causes the lifting/lowering device to perform the lifting/lowering operation of lifting the holding unit 10 in a state of holding the article 2 from the transferring height to the traveling height.

Thus, the control unit 30 lifts/lowers the holding unit 10 when the article 2 is transferred between the holding unit 10 and the transfer destination location 6. Then, when the holding unit 10 is lowered, the control unit 30 controls the lifting/lowering drive unit 23 to gradually increase the lowering velocity of the holding unit 10 toward a target lowering velocity VD (see FIG. 4), perform a constant velocity lowering operation of maintaining the lowering velocity of the holding unit 10 at the target lowering velocity VD, and then gradually decrease the lowering velocity of the holding unit 10 from the target lowering velocity VD to stop the holding unit 10. Herein, the operation of gradually increasing the lowering velocity of the holding unit 10 toward the target lowering velocity VD is referred to as an accelerated lowering operation, and the operation of gradually decreasing the lowering velocity of the holding unit 10 from the target lowering velocity VD to stop the holding unit 10 is referred to as a decelerated lowering operation.

In a graph of FIG. 4 to be referred to later, the period from time t1 to time t2 is an execution period of the accelerated lowering operation, the period from time t2 to time t3 is an execution period of the constant velocity lowering operation, and the period from time t3 to time t4 is an execution period of the decelerated lowering operation. In graphs of FIGS. 6 and 7 to be referred to later, the period from time t21 to time t22 is an execution period of the accelerated lowering operation, the period from time t22 to time t23 is an execution period of the constant velocity lowering operation, and the period from time t23 to time t24 is an execution period of the decelerated lowering operation.

When the holding unit 10 is lifted, the control unit 30 controls the lifting/lowering drive unit 23 to gradually increase the lifting velocity of the holding unit 10 toward a target lifting velocity VU (see FIG. 5), perform a constant velocity lifting operation of maintaining the lifting velocity of the holding unit 10 at the target lifting velocity VU, and then gradually decrease the lifting velocity of the holding unit 10 from the target lifting velocity VU to stop the holding unit Herein, the operation of gradually increasing the lifting velocity of the holding unit 10 toward the target lifting velocity VU is referred to as an accelerated lifting operation, and the operation of gradually decreasing the lifting velocity of the holding unit 10 from the target lifting velocity VU to stop the holding unit 10 is referred to as a decelerated lifting operation.

In a graph of FIG. 5 to be referred to later, the period from time t11 to time t12 is an execution period of the accelerated lifting operation, the period from time t12 to time t13 is an execution period of the constant velocity lifting operation, and the period from time t13 to time t14 is an execution period of the decelerated lifting operation. In graphs of FIGS. 8 and 9 to be referred to later, the period from time t31 to time t32 is an execution period of the accelerated lifting operation, the period from time t32 to time t33 is an execution period of the constant velocity lifting operation, the period from time t33 to time t34 is an execution period of the decelerated lifting operation.

A winding-up diameter R (see FIG. 3) which is the diameter of an outer surface S of the belt 22 wound around the pulley 21 gradually decreases by the unwinding of the belt 22 from the pulley 21, and gradually increases by the winding-up of the belt 22 around the pulley 21. Therefore, if the rotational velocity of the pulley 21 is made constant in the constant velocity lowering operation, the lowering velocity of the holding unit 10 during the constant velocity lowering operation decreases with a gradual decrease in the winding-up diameter R. As a result, as illustrated in comparative example of FIG. 4, the lowering velocity (absolute value) of the holding unit 10 decreases immediately after the lowering velocity (absolute value) has increased (in other words, decelerating immediately after accelerating) in switching (time t2 in FIG. 4) from the accelerated lowering operation to the constant velocity lowering operation, and thus a large change in the acceleration occurs in the holding unit 10, so that the vibration acting on the holding unit 10 and the article 2 held by the holding unit 10 is likely to increase. In FIG. 4, an "actual velocity" indicates the lowering velocity of the holding unit 10.

If the rotational velocity of the pulleys 21 is made constant in the constant velocity lifting operation, the lifting velocity of the holding unit 10 during the constant velocity lifting operation increases with the gradual increase in the winding-up diameter R. As a result, as illustrated in comparative example of FIG. 5, the lifting velocity (absolute value) of the holding unit 10 decreases immediately after the lifting velocity (absolute value) has increased (in other words, decelerating immediately after accelerating) in switching (time t13 in FIG. 5) from the constant velocity lifting operation to the decelerated lifting operation, and thus a large change in the acceleration occurs in the holding unit 10, so that the vibration acting on the holding unit 10 and the article 2 held by the holding unit 10 is likely to increase. In FIG. 5, the "actual velocity" indicates the lifting velocity of the holding unit 10.

Figure 4:
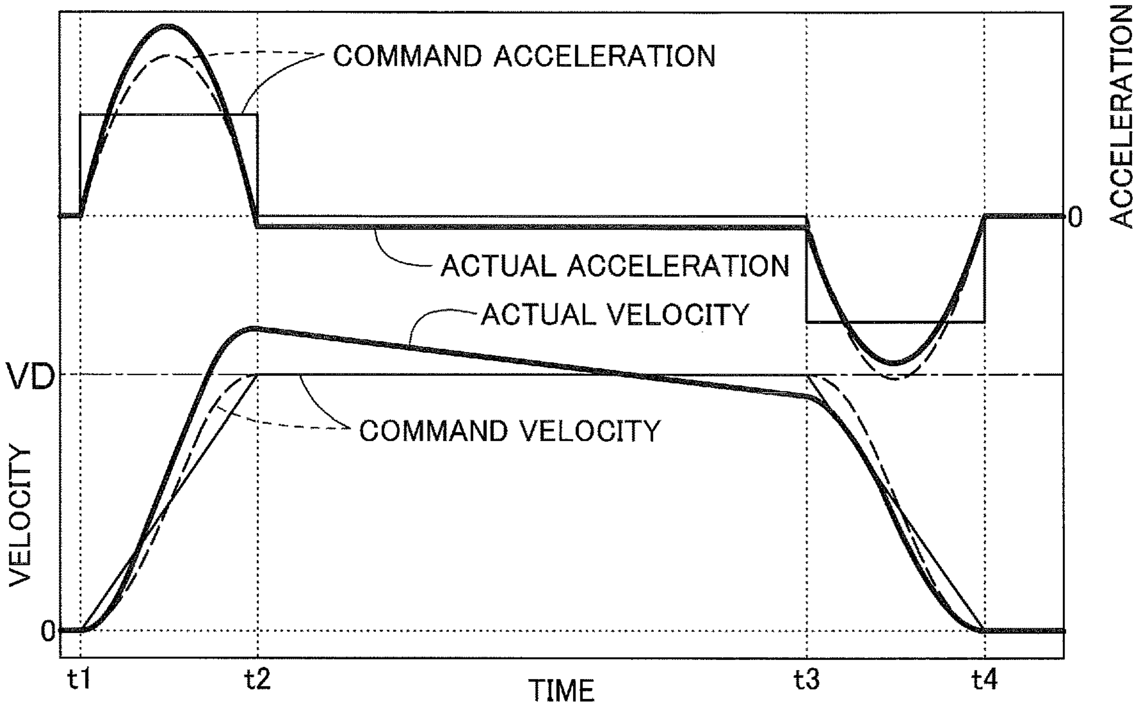
FIG. 4 is a view illustrating an example of a change over time of the lowering velocity and the lowering acceleration of a holding unit according to comparative example.
Figure 5:
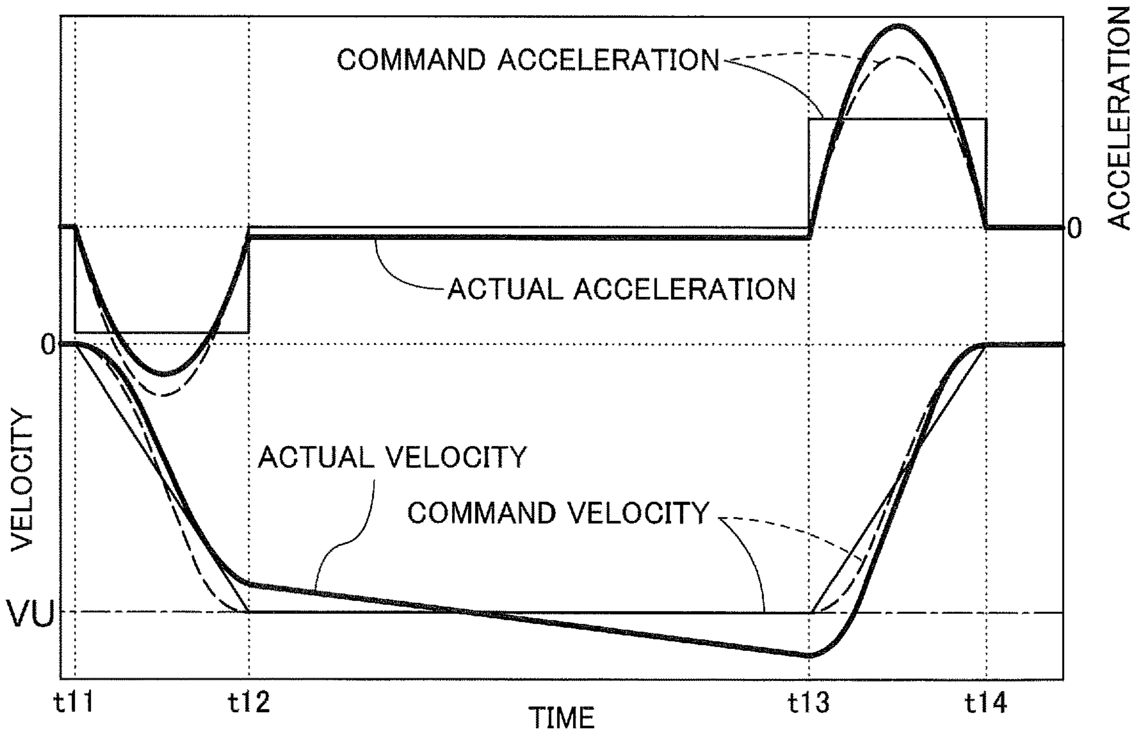
FIG. 5 is a view illustrating an example of a change over time of the lifting velocity and the lifting acceleration of the holding unit according to comparative example.

In FIGS. 4 and 5, a "command acceleration" indicates a command for the rotational acceleration of the pulleys 21, and a "command velocity" indicates a command for the rotational velocity of the pulleys 21. The "command velocity" is equivalent to the first derivative value (time derivative value) of a command for the rotational position of the pulleys 21. The "command acceleration" is equivalent to the second derivative value (time derivative value) of the command for the rotational position of the pulleys 21. In FIGS. 4 and 5, the "command acceleration" indicated by the solid line indicates a command in which the rotational acceleration of the pulleys 21 changes stepwise, and the "command velocity" indicated by the solid line indicates the command for the rotational velocity corresponding to the "command acceleration" indicated by the solid line. The "command acceleration" indicated by the broken line indicates a command in which sinusoidal processing (processing of changing a stepwise change to a sinusoidal change) is applied to the "command acceleration" indicated by the solid line. The "command velocity" indicated by the broken line indicates the command for the rotational velocity corresponding to the "command acceleration" indicated by the broken line.

In FIGS. 4 and 5, an "actual acceleration" and the "actual velocity" indicates the lifting/lowering acceleration and the lifting/lowering velocity of the holding unit 10 when the pulleys 21 are rotated according to the "command acceleration" indicated by the broken line and the "command velocity" indicated by the broken line, respectively. More specifically, the "actual acceleration" and the "actual velocity" indicate the lifting/lowering acceleration and the lifting/lowering velocity, respectively, of the holding unit 10 when the lifting/lowering drive unit 23 rotates the pulleys 21 according to the above-described command subjected to the sine wave processing. In FIGS. 4 and 5, for ease of understanding, the command for the rotational acceleration (command acceleration) of the pulleys 21 and the lifting/lowering acceleration (actual acceleration) of the holding unit 10 are superimposed, and the command for the rotational velocity (command velocity) of the pulleys 21 and the lifting/lowering velocity (actual velocity) of the holding unit 10 are superimposed. FIGS. 4 and 5, and FIGS. 6 to 9 to be referred to later illustrate graphs such that the signs of the velocities (rotational velocity of the pulleys 21 and lifting/lowering velocity of the holding unit 10) when the holding unit 10 is lowered are positive (upper side of the vertical axis). Therefore, the lowering velocity (absolute value) of the holding unit 10 increases toward the upper side in the drawings, and the lifting velocity (absolute value) of the holding unit 10 increases toward the lower side in the drawings.

In comparative example illustrated in FIG. 4, the rotational velocity of the pulleys 21 is made constant in the constant velocity lowering operation performed in the period from time t2 to time t3, and therefore the actual acceleration of the holding unit 10 during the constant velocity lowering operation becomes negative, and the actual velocity (absolute value of the lowering velocity) of the holding unit 10 during the constant velocity lowering operation decreases with the elapse of time. As a result, a large change in the acceleration is likely to occur in the holding unit 10 in switching (time t2 in FIG. 4) from the accelerated lowering operation to the constant velocity lowering operation as described above. In comparative example illustrated in FIG. 5, the rotational velocity of the pulleys 21 is made constant in the constant velocity lifting operation performed in the period from time t12 to time t13, and therefore the actual acceleration of the holding unit 10 during the constant velocity lifting operation becomes negative, and the actual velocity (absolute value of the lifting velocity) of the holding unit 10 during the constant velocity lifting operation increases with the elapse of time. As a result, a large change in the acceleration is likely to occur in the holding unit 10 in switching (time t13 in FIG. 5) from the constant velocity lifting operation to the decelerated lifting operation as described above.

Figure 6:
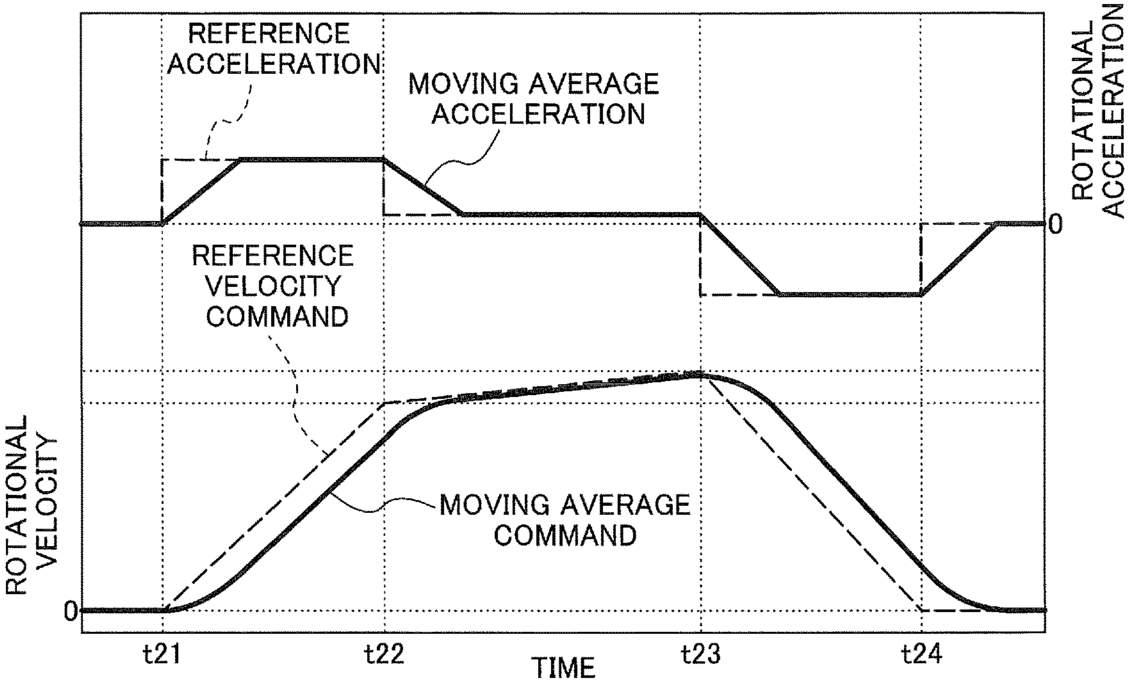
FIG. 6 is a view illustrating an example of a change over time of the rotational velocity and the rotational acceleration of the pulley according to the embodiment when a holding unit is lowered.

As described above, when the rotational velocity of the pulleys 21 is made constant in the constant velocity lowering operation, a large change in the acceleration is likely to occur in the holding unit 10 in switching from the accelerated lowering operation to the constant velocity lowering operation, and, when the rotational velocity of the pulleys 21 is made constant in the constant velocity lifting operation, a large change in the acceleration is likely to occur in the holding unit 10 in switching from the constant velocity lifting operation to the decelerated lifting operation. In view of this point, as illustrated in FIG. 6, the control unit 30 controls the lifting/lowering drive unit 23 to gradually increase the rotational velocity (absolute value) of the pulleys 21 in response to the gradual decrease in the winding-up diameter R by the unwinding in the constant velocity lowering operation. In the state in which the holding unit 10 holds the article 2 and the state in which the holding unit 10 does not hold the article 2, the control unit 30 controls the lifting/lowering drive unit 23 as described above in at least the former state. By controlling the lifting/lowering drive unit 23 as described above, the change in the lowering velocity of the holding unit 10 during the constant velocity lowering operation (period from time t22 to time t23 in FIGS. 6 and 7) can be suppressed to a low degree, and the change in the acceleration of the holding unit 10 in switching (time t22 in FIGS. 6 and 7) from the accelerated lowering operation to the constant velocity lowering operation can be suppressed to a low degree as illustrated in FIG. 7.

Figure 8:
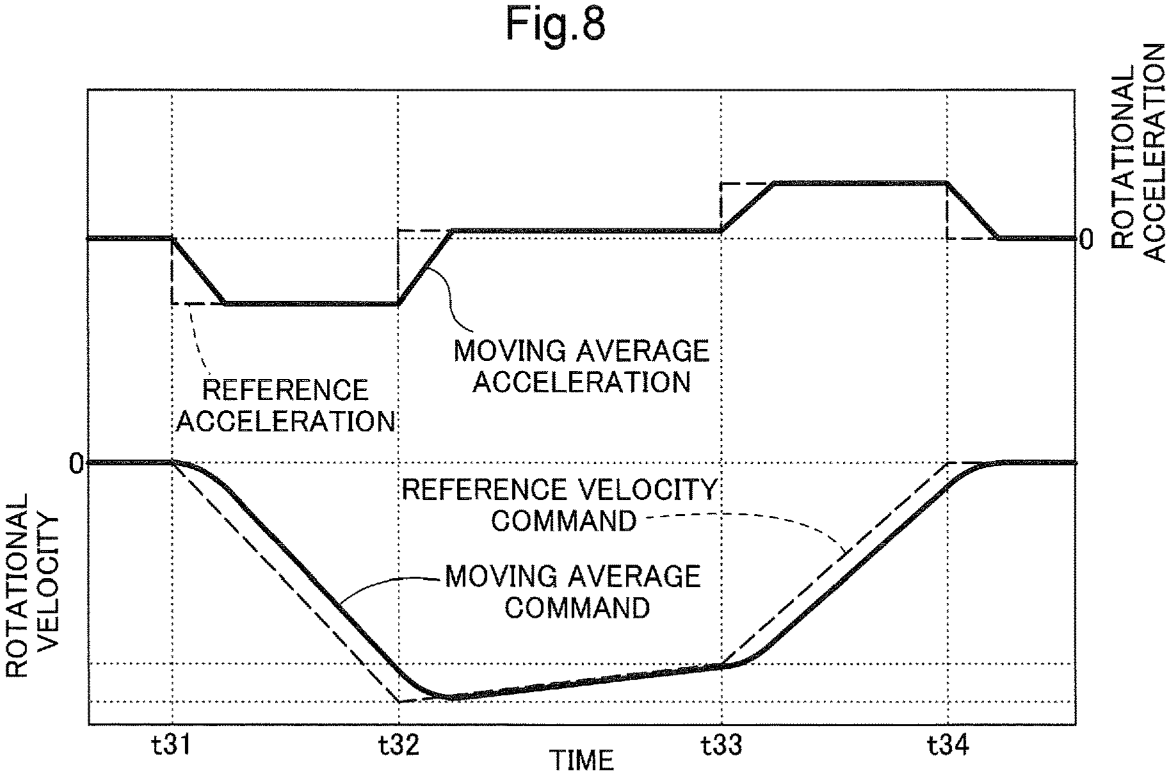
FIG. 8 is a view illustrating an example of a change over time of the rotational velocity and the rotational acceleration of the pulley according to the embodiment when the holding unit is lifted.

In this embodiment, the control unit 30 controls the lifting/lowering drive unit 23 to gradually decrease the rotational velocity (absolute value) of the pulleys 21 in response to the gradual increase in the winding-up diameter R by the winding-up in the constant velocity lifting operation as illustrated in FIG. 8. In the state in which the holding unit 10 holds the article 2 and the state in which the holding unit 10 does not hold the article 2, the control unit 30 controls the lifting/lowering drive unit 23 as described above in at least the former state. By controlling the lifting/lowering drive unit 23 as described above, a change in the lifting velocity of the holding unit 10 during the constant velocity lifting operation (period from time t32 to time t33 in FIGS. 8 and 9) can be suppressed to a low degree, and the change in the acceleration of the holding unit 10 in switching (time t33 in FIGS. 8 and 9) from the constant velocity lifting operation to the decelerated lifting operation can be suppressed to a low degree as illustrated in FIG. 9.

In FIGS. 6 and 8, a "reference acceleration" indicates the command for the rotational acceleration of the pulleys 21 changing stepwise, and a "reference velocity command" indicates the command for the rotational velocity of the pulleys 21 corresponding to the "reference acceleration". In FIGS. 6 and 8, a "moving average acceleration" indicates a command in which moving averaging processing (e.g., simple moving averaging processing without weighting) is applied to the "reference acceleration", and a "moving average command" indicates a command in which the moving averaging processing is applied to the "reference velocity command" (i.e., the command for the rotational velocity of the pulleys 21 corresponding to the "moving average acceleration").

Figure 7:
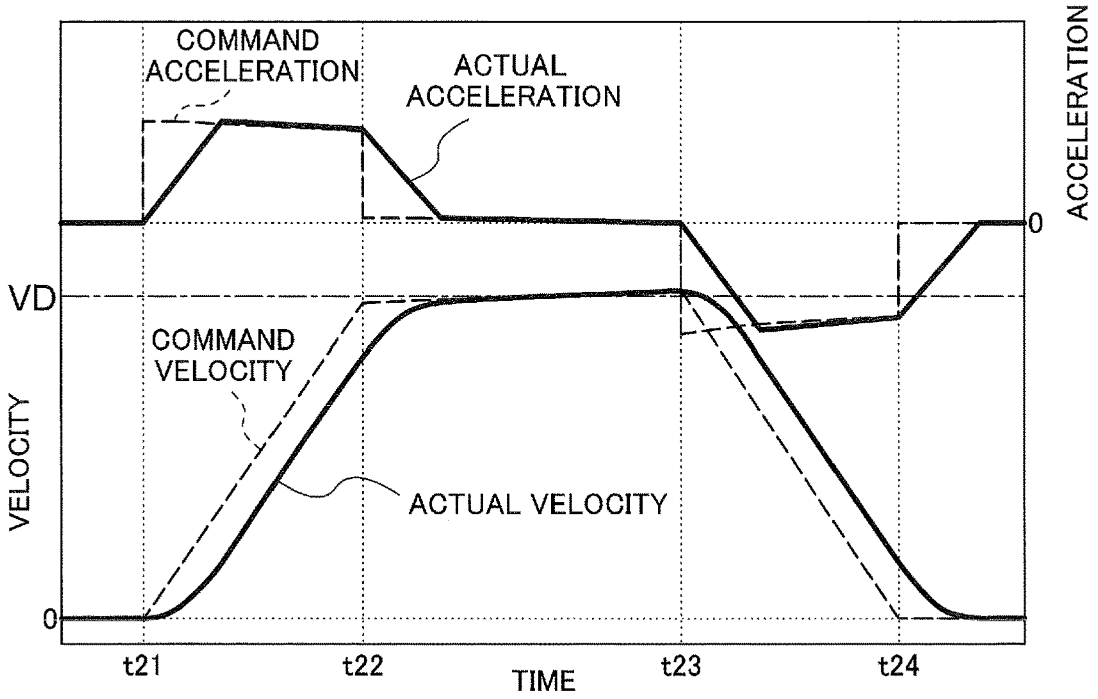
FIG. 7 is a view illustrating an example of a change over time of the lowering velocity and the lowering acceleration of the holding unit according to the embodiment.
Figure 9:
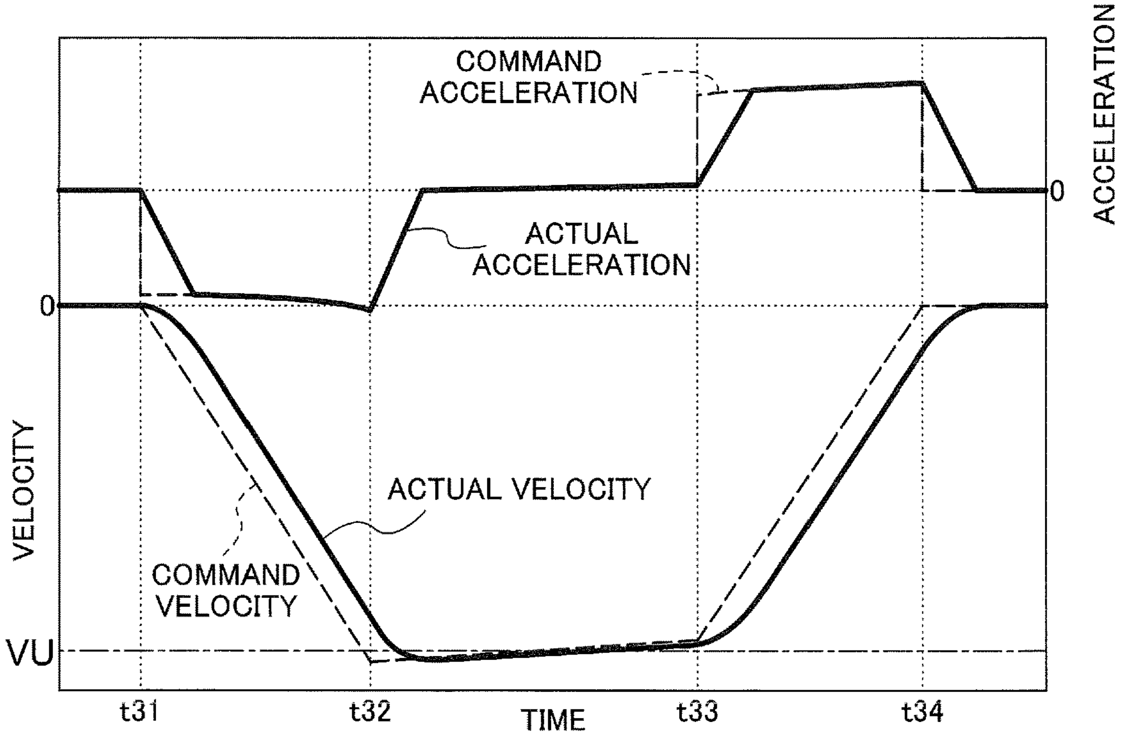
FIG. 9 is a view illustrating an example of a change over time of the lifting velocity and the lifting acceleration of the holding unit according to the embodiment.

In FIGS. 7 and 9, the "command acceleration" and the "command velocity" indicate the lifting/lowering acceleration and the lifting/lowering velocity of the holding unit 10 when the pulleys 21 are rotated according to the "reference acceleration" and the "reference velocity command", respectively. In FIGS. 7 and 9, the "actual acceleration" and the "actual velocity" indicate the lifting/lowering acceleration and the lifting/lowering velocity of the holding unit 10 when the pulleys 21 are rotated according to the "moving average acceleration" and the "moving average command", respectively. More specifically, the "actual acceleration" and the "actual velocity" indicate the lifting/lowering acceleration and the lifting/lowering velocity, respectively, of the holding unit 10 when the lifting/lowering drive unit 23 rotates the pulleys 21 according to the command subjected to the moving averaging processing.

In this embodiment, the control unit 30 controls the lifting/lowering drive unit 23 to rotate the pulleys 21 according to the command subjected to the moving averaging processing described above. More specifically, in this embodiment, when the lowering velocity and the lifting velocity of the holding unit 10 are changed, the control unit 30 generates the reference velocity command according to the temporal velocity change pattern (pattern of the velocity change over time) (herein, rotational velocity of the pulleys 21) such that the acceleration (herein, rotational acceleration of the pulleys 21) changes stepwise. Herein, the acceleration also includes the deceleration (negative acceleration). Then, the control unit 30 generates the moving average command obtained by calculating the moving average of the reference velocity command in the set period, and controls the lifting/lowering drive unit 23 based on the moving average command. The moving average command is generated based on time series data of the reference velocity commands in the set period. The control unit 30 controls the lifting/lowering drive unit 23 by position control based on a position command (e.g., position command generated by integrating the moving average command) generated from the moving average command or controls the lifting/lowering drive unit 23 by velocity control based on the moving average command, for example.

In the constant velocity lowering operation, the rotational velocity of the pulleys 21 may be gradually increased such that the lowering velocity of the holding unit 10 in the constant velocity lowering operation becomes constant. In the examples illustrated in FIGS. 6 and 7, the absolute value of the rotational velocity of the pulleys 21 is gradually increased such that the lowering velocity of the holding unit 10 during the constant velocity lowering operation changes at a change rate lower than that during the accelerated lowering operation and the decelerated lowering operation (in the example illustrated in FIG. 7, the absolute value of the lowering velocity gradually increases). In the constant velocity lifting operation, the rotational velocity of the pulleys 21 may be gradually decreased such that the lifting velocity of the holding unit 10 in the constant velocity lifting operation becomes constant. In the examples illustrated in FIGS. 8 and 9, the absolute value of the rotational velocity of the pulleys 21 is gradually decreased such that the lifting velocity of the holding unit 10 during the constant velocity lifting operation changes at a change rate lower than that during the accelerated lifting operation and the decelerated lifting operation (in the example illustrated in FIG. 9, the absolute value of the lifting velocity gradually decreases). By permitting the changes in the lifting/lowering velocity of the holding unit 10 in the constant velocity lowering operation and the constant velocity lifting operation as described above, profiles of the rotational velocity and the rotational acceleration of the pulleys 21 can be made into profiles which make it possible to simplify the calculation in the control unit 30.

When the holding unit 10 is lowered, the unwinding acceleration of the belts 22 from the pulleys 21 is prevented from exceeding the gravitational acceleration, so that the generation of the vibration of the holding unit 10 by loosening of the belts 22 can be avoided. Herein, the unwinding acceleration of the belts 22 from pulleys 21 is determined according to the rotational acceleration and the winding-up diameter R of the pulleys 21. In view of this point, a configuration is preferable in which, when the holding unit 10 is lowered, the control unit 30 controls the rotational acceleration of the pulleys 21 such that the unwinding acceleration of the belts 22 from the pulleys 21 does not exceed the gravitational acceleration according to the winding-up diameter R at the start of the lowering of the holding unit 10 (in other words, such that a state in which no tension is applied to the belts 22 is avoided), for example.

When the rotational acceleration of the pulleys 21 is controlled such that the unwinding acceleration of the belts 22 from the pulleys 21 does not exceed the gravitational acceleration as described above, a configuration is preferable in which the control unit 30, when the holding unit 10 is lowered, controls the lifting/lowering drive unit 23 to gradually increase the rotational acceleration of the pulleys 21 within a range in which the unwinding acceleration of the belts 22 from the pulleys 21 does not exceed the gravitational acceleration in a period in which the lowering velocity of the holding unit 10 is gradually increased toward the target lowering velocity VD (i.e., execution period of the accelerated lowering operation) in response to the gradual decrease in the winding-up diameter R by the unwinding, for example. By controlling the lifting/lowering drive unit 23 as described above, the holding unit 10 can be quickly lowered while avoiding the generation of the vibration of the holding unit 10 by the loosening of the belts 22.

When the holding unit 10 holds the article 2, the tension applied to the belts 22 changes according to the weight of the article 2. Considering this point, a configuration is preferable in which the control unit 30, when the holding unit 10 is lowered, controls the lifting/lowering drive unit 23 such that a driving force of rotating the pulleys 21 to the side where the lifting/lowering drive unit 23 lowers the holding unit 10 does not exceed a load acting on the belts 22 by the weight of the article 2, for example. By controlling the lifting/lowering drive unit 23 considering the weight of the article 2 as described above, the pulleys 21 can be rotated to avoid the state in which no tension is applied to the belts 22.

Other Embodiments (1) The above-described embodiments give the description using the configuration in which, when the lowering velocity and the lifting velocity of the holding unit 10 are changed, the control unit 30 generates the reference velocity command according to the temporal velocity change pattern in which the acceleration changes stepwise, and generates the moving average command obtained by calculating the moving average of the reference velocity command in the set period, and controls the lifting/lowering drive unit 23 based on the moving average command as an example. However, this disclosure is not limited to such a configuration, and for example, a configuration may be acceptable in which the control unit 30 controls the lifting/lowering drive unit 23 based on the reference velocity command.

(2) In the above-described embodiments, the description is given using the configuration in which the article lifting/lowering apparatus 1 is movable in the horizontal direction as an example. However, this disclosure is not limited to such a configuration, and a configuration may be acceptable in which the article lifting/lowering apparatus 1 is immovable in the horizontal direction.

(3) The configuration disclosed in each embodiment described above can also be applied in combination with the configurations disclosed in the other embodiments (including a combination of the embodiments described as the other embodiments) insofar as no contradiction occurs. Also with respect to the other configurations, the embodiments disclosed in this specification are merely examples in all respects. Therefore, various modifications can be made as appropriate without departing from the gist of the present disclosure.

Outline of Embodiments Above

Hereinafter, the outline of the article lifting/lowering apparatus described above is described.

The article lifting/lowering apparatus includes: the holding unit configured to hold the article; the lifting/lowering device configured to lift and lower the holding unit; and the control unit configured to control the lifting/lowering device, in which the lifting/lowering device includes: the pulleys, the belts wound around the pulleys to be freely wound-up and unwound; and the drive unit configured to rotationally drive the pulleys, and is configured to lower the holding unit by unwinding the belts from the pulleys and lift the holding unit by winding-up the belts around the pulleys in a state in which the holding unit is suspended by the belts, and the control unit is configured to, when the holding unit is lowered, control the drive unit to (i) gradually increase the lowering velocity of the holding unit toward the target lowering velocity, (ii) perform the constant velocity lowering operation of maintaining the lowering velocity of the holding unit at the target lowering velocity, and then (iii) gradually decrease the lowering velocity of the holding unit from the target lowering velocity to stop the holding unit, and the control unit is configured to, in the constant velocity lowering operation, control the drive unit to gradually increase the rotational velocity of the pulleys in response to a gradual decrease in the diameter of the outer surfaces of the belts wound-up around the pulleys by the unwinding.

According to this configuration, considering that the winding-up diameter, which is the diameter of the outer surfaces of the belts wound around the pulleys, gradually decreases by the unwinding of the belts from the pulleys, the rotational velocity of the pulleys in the constant velocity lowering operation can be increased in response to the gradual decrease in the winding-up diameter. Therefore, as compared with the case where the rotational velocity of the pulleys is made constant in the constant velocity lowering operation, the change in the lowering velocity of the holding unit during the constant velocity lowering operation can be suppressed to a low degree. As a result, the change in the acceleration of the holding unit in switching from the accelerated lowering operation to the constant velocity lowering operation can be suppressed to a low degree. Thus, the vibration acting on the holding unit and the article held by the holding unit in the switching is easily suppressed to a low degree.

Herein, when the holding unit is lifted, the control unit preferably controls the drive unit to gradually increase the lifting velocity of the holding unit toward the target lifting velocity, perform the constant velocity lifting operation of maintaining the lifting velocity of the holding unit at the target lifting velocity, and then gradually decreases the lifting velocity of the holding unit from the target lifting velocity to stop the holding unit, and, in the constant velocity lifting operation, to gradually decrease the rotational velocity of the pulleys in response to the gradual increase in the diameter of the outer surfaces of the belts wound-up around the pulleys by the winding-up.

When the holding unit is lifted, it is conceivable to perform the accelerated lifting operation of gradually increasing the lifting velocity of the holding unit toward the target lifting velocity, perform the constant velocity lifting operation of maintaining the lifting velocity of the holding unit at the target lifting velocity, and then perform the decelerated lifting operation of gradually decreasing the lifting velocity of the holding unit from the target lifting velocity to stop the holding unit. When the holding unit is lifted as described above, the lifting velocity of the holding unit in the constant velocity lifting operation increases with an increase in the winding-up diameter if the rotational velocity of the pulleys is made constant in the constant velocity lifting operation. As a result, the lifting velocity of the holding unit decreases immediately after the lifting velocity has increased (in other words, decelerating immediately after accelerating) in switching from the constant velocity lifting operation to the decelerated lifting operation, and thus a large change in the acceleration occurs in the holding unit, so that the vibration acting on the holding unit and the article held by the holding unit is likely to increase.

In this point, according to this configuration, considering that the winding-up diameter gradually increases by the winding-up of the belts around the pulleys, the rotational velocity of the pulleys in the constant velocity lifting operation can be decreased in response to the gradual increase in the winding-up diameter. Therefore, as compared with the case where the rotational velocity of the pulley is made constant in the constant velocity lifting operation, the change in the lifting velocity of the holding unit during the constant velocity lifting operation can be suppressed to a low degree. As a result, the change in the acceleration of the holding unit in switching from the constant velocity lifting operation to the decelerated lifting operation can be suppressed to a low degree. Thus, the vibration acting on the holding unit and the article held by the holding unit in the switching is easily suppressed to a low degree.

When the holding unit is lowered, the control unit preferably controls the drive unit to gradually increase the rotational acceleration of the pulleys such that the unwinding acceleration of the belts from the pulleys does not exceed the gravitational acceleration in response to the gradual decrease in the diameter of the outer surfaces of the belts wound-up around the pulleys by the unwinding in the period of gradually increasing the lowering velocity of the holding unit toward the target lowering velocity.

According to this configuration, in the execution period of the accelerated lowering operation described above, the rotational acceleration of the pulleys can be increased in response to the gradual decrease in the winding-up diameter insofar as the state in which no tension is applied to the belts is avoided. Therefore, the holding unit can be quickly lowered while avoiding the generation of the vibration of the holding unit by the loosening of the belts.

When the holding unit is lowered, the control unit preferably controls the rotational acceleration of the pulleys such that the unwinding acceleration of the belts from the pulleys does not exceed the gravitational acceleration according to the diameter of the outer surfaces of the belts wound-up around the pulleys at the start of the lowering of the holding unit.

According to this configuration, the rotational acceleration of the pulleys when the holding unit is lowered can be controlled to avoid the state in which no tension is applied to the belts according to the winding-up diameter at the start of the lowering of the holding unit. Therefore, the holding unit can be appropriately lowered while avoiding the generation of the vibration of the holding unit by the loosening of the belts.

When the holding unit is lowered, the control unit preferably controls the drive unit such that the driving force of rotating the pulleys to the side where the drive unit lowers the holding unit does not exceed a load acting on the belts by the weight of the article.

According to this configuration, the rotational acceleration of the pulleys when the holding unit is lowered can be controlled to avoid the state in which no tension is applied to the belts considering the load acting on the belts by the weight of the article. Therefore, the holding unit can be appropriately lowered while avoiding the generation of the vibration of the holding unit by the loosening of the belts.

When the lowering velocity and the lifting velocity of the holding unit are changed, the control unit preferably generates the reference velocity command according to the temporal velocity change pattern in which the acceleration changes stepwise, and generates the moving average command obtained by calculating the moving average of the reference velocity command in the set period, and controls the drive unit based on the moving average command.

According to this configuration, when the holding unit is lowered, the change rate (jerk) of the acceleration of the holding unit in switching from the accelerated lowering operation to the constant velocity lowering operation or in switching from the constant velocity lowering operation to the decelerated lowering operation can be suppressed to a degree lower than that in the case of controlling the drive unit based on the reference velocity command. When the holding unit is lifted, the change rate of the acceleration of the holding unit in switching from the accelerated lifting operation to the constant velocity lifting operation or in switching from the constant velocity lifting operation to the decelerated lifting operation can be suppressed to a degree lower than that in the case of controlling the drive unit based on the reference velocity command. Therefore, the vibration acting on the holding unit and the article held by the holding unit in switching between the operations to a degree lower than that in the case of controlling the drive unit based on the reference velocity command.

The article lifting/lowering apparatus according to this disclosure may be able to exhibit at least one of the above-described effects.

What is claimed is:

1. An article lifting/lowering apparatus comprising:

a holding unit configured to hold an article;

a lifting/lowering device configured to lift and lower the holding unit; and a control unit configured to control the lifting/lowering device, wherein;

the lifting/lowering device comprises:

a pulley;

a belt wound around the pulley to be freely wound-up and unwound; and a drive unit configured to rotationally drive the pulley, and is configured to lower the holding unit by unwinding the belt from the pulley and lift the holding unit by winding-up the belt around the pulley in a state in which the holding unit is suspended by the belt, and the control unit is configured to, when the holding unit is lowered, control the drive unit to: (i) gradually increase a lowering velocity of the holding unit toward a target lowering velocity, (ii) perform a constant velocity lowering operation of maintaining the lowering velocity of the holding unit at the target lowering velocity, and then (iii) gradually decrease the lowering velocity of the holding unit from the target lowering velocity to stop the holding unit, and the control unit is configured to, in the constant velocity lowering operation, control the drive unit to gradually increase a rotational velocity of the pulley in response to a gradual decrease in a diameter of an outer surface of the belt wound-up around the pulley by the unwinding.

2. The article lifting/lowering apparatus according to claim 1, wherein:

the control unit is configured to, when the holding unit is lifted, control the drive unit to: (i) gradually increase a lifting velocity of the holding unit toward a target lifting velocity, (ii) perform a constant velocity lifting operation of maintaining the lifting velocity of the holding unit at the target lifting velocity, and then (iii) gradually decrease the lifting velocity of the holding unit from the target lifting velocity to stop the holding unit, and the control unit is configured to, in the constant velocity lifting operation, control the drive unit to gradually decrease the rotational velocity of the pulley in response to a gradual increase in the diameter of the outer surface of the belt wound-up around the pulley by the winding-up.

3. The article lifting/lowering apparatus according to claim 1, wherein:

the control unit is configured to, when the holding unit is lowered, control the drive unit to gradually increase a rotational acceleration of the pulley such that an unwinding acceleration of the belt from the pulley does not exceed a gravitational acceleration in response to the gradual decrease in the diameter of the outer surface of the belt wound-up around the pulley by the unwinding in a period of gradually increasing the lowering velocity of the holding unit toward the target lowering velocity.

4. The article lifting/lowering apparatus according to claim 1, wherein:

the control unit is configured to, when the holding unit is lowered, control a rotational acceleration of the pulley such that an unwinding acceleration of the belt from the pulley does not exceed a gravitational acceleration according to the diameter of the outer surface of the belt wound-up around the pulley at a start of the lowering of the holding unit.

5. The article lifting/lowering apparatus according to claim 1, wherein:

the control unit is configured to, when the holding unit is lowered, control the drive unit such that a driving force of rotating the pulley to a side where the drive unit lowers the holding unit does not exceed a load acting on the belt by a weight of the article.

6. The article lifting/lowering apparatus according to claim 1, wherein:

the control unit is configured to, when the lowering velocity and the lifting velocity of the holding unit are changed, generate: (i) a reference velocity command according to a temporal velocity change pattern in which an acceleration changes stepwise, and (ii) a moving average command obtained by calculating a moving average of the reference velocity command in a set period, and control the drive unit based on the moving average command.

* * * * *